Dec. 14, 1937.   W. W. GLEASON   2,102,066
EDGING FOR SPRING ASSEMBLIES FOR UPHOLSTERY
Filed June 29, 1936   2 Sheets-Sheet 1
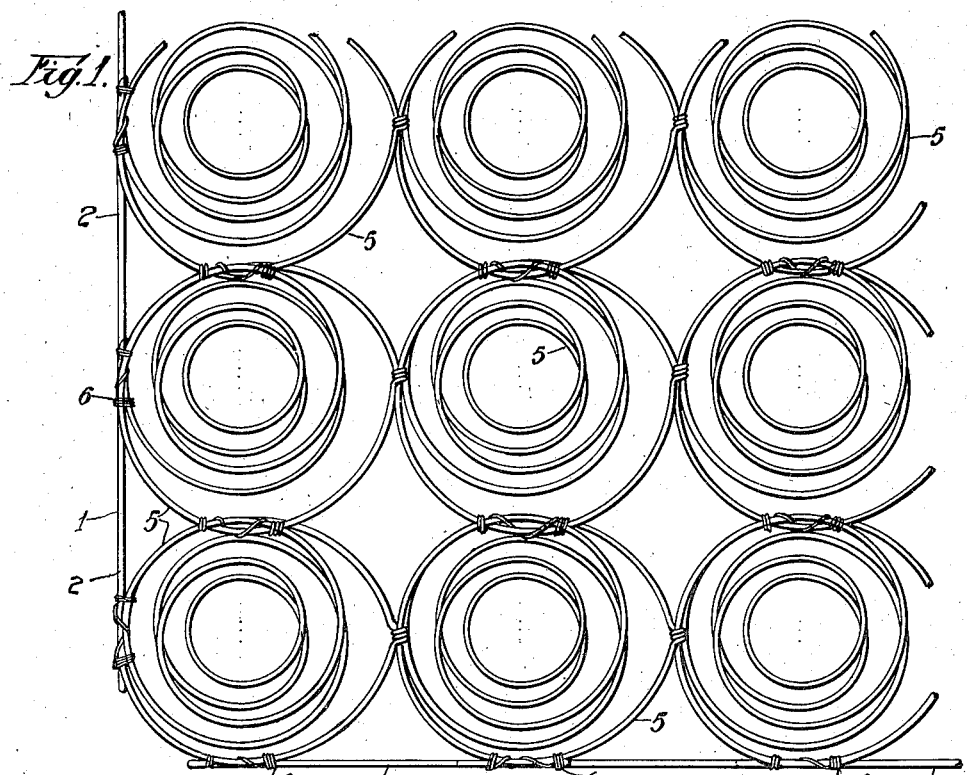
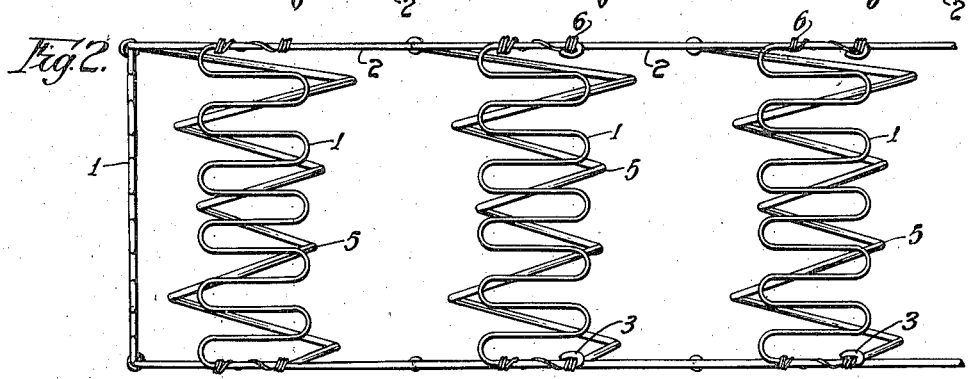
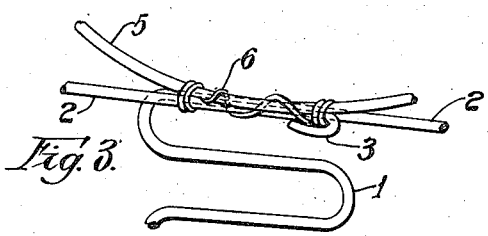
Inventor:
William W. Gleason, Dec. 14, 1937.  W. W. GLEASON  2,102,066
EDGING FOR SPRING ASSEMBLIES FOR UPHOLSTERY
Filed June 29, 1936    2 Sheets-Sheet 2
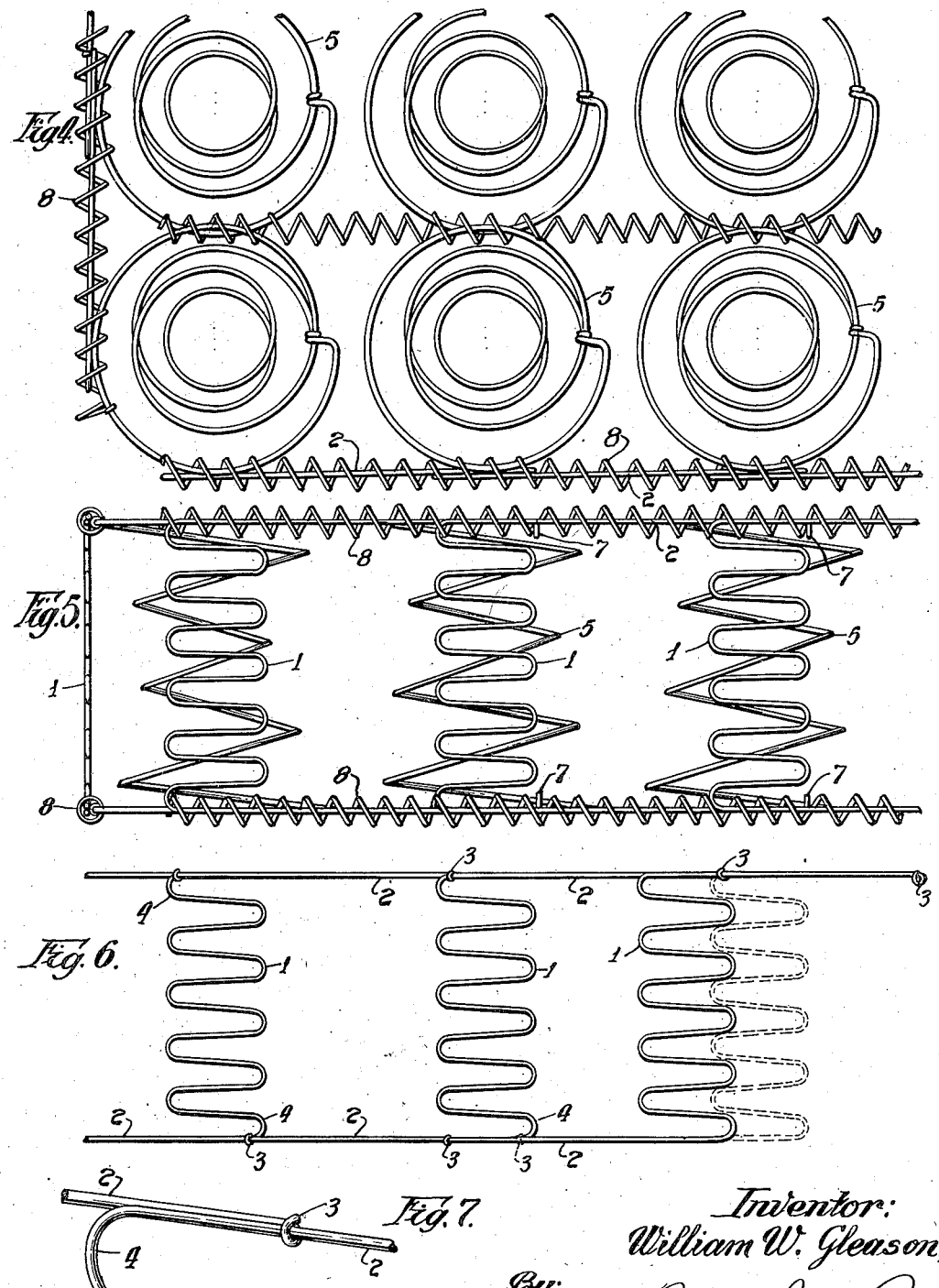

Patented Dec. 14, 1937

2,102,066

UNITED STATES PATENT OFFICE 2,102,066

EDGING FOR SPRING ASSEMBLIES FOR UPHOLSTERY

William W. Gleason, Chicago, Ill., assignor to Nachman Spring-Filled Corporation, Chicago, Ill., a corporation of Illinois Application June 29, 1936, Serial No. 87,904

3 Claims. (Cl. 5—260)

The main object of the present invention is to provide a reinforcing edge construction for practically all types of spring assemblies for mattresses and cushions which will not only stiffen the periphery of the structure, but will also serve to prevent the boxings of such structures from being appreciably deformed and which, in instances selected, may be constructed to provide the equivalent of border wires extending around and secured to the marginal portions of the terminal coils of the marginal springs of such assemblies.

The embodiment of the invention herein illustrated and described constitutes the preferred form of construction as applied to all metal spring assemblies, said structure being capable of modification to adapt the same for inclusion in spring assemblies wherein the springs are enclosed in fabric casings and are maintained in predetermined spaced relation by the latter.

In the accompanying drawings,

Fig. 1 is a fragmentary plan view of an all-metal spring assembly equipped with reinforcing edging constructed in accordance with this invention.

Fig. 2 is a fragmentary side elevation of the same.

Fig. 3 is a fragmentary detail perspective view of an edge portion of the structure of Figs. 1 and 2.

Fig. 4 is a view similar to Fig. 3 showing another means for securing the edging to a spring assembly.

Fig. 5 is a side elevation of a spring assembly embodying the invention.

Fig. 6 is a view in elevation showing the edging in the form of an articulate structure capable of being secured to any type of spring assembly.

Fig. 7 is a fragmentary detail perspective view showing the sliding connection between the shanks of the edge springs bordering the spring assembly.

Referring first to Fig. 6 and Fig. 7 the structure of the present invention consists primarily of a series of zig-zag resilient wire units 1 which constitute flat vertical spring elements, each of which terminates in extension tongues 2. In the instance illustrated the tongues 2 of the respective elements 1 extend in opposite directions and each thereof is equipped at its extremity with a loop or hook formation 3 which engages an end loop 4 of a contiguous element 1 so that each of said elements 1 is thus connected with two contiguous elements 1. The connections thus effected are sliding and permit expansion or collapsing of the resulting articulate structure longitudinally of the same. The connecting loops 3 are closed, of course, to prevent disengagement thereof from the parts engaged thereby.

This articulate structure may be made in long lengths and formed into rolls to be sold independently of spring assemblies and incorporated into the latter by the purchaser thereof.

Obviously, the extension portions or tongues 2 of the elements 1 may extend in the same instead of in opposite directions as shown.

Furthermore, the connection or connections between elements 1 effected by means of said extension portions or tongues 2 may be effected after each of said elements 1 is connected at its upper and lower ends respectively to the marginal portions of the terminal coils of the marginal springs 5 of a spring assembly such as is shown in Figs. 1 and 2, wherein said upper and lower ends of the several elements 1 are secured to the respective springs by the wire ties 6 of the type described and claimed in and by Letters Patent to Oliver Hetherington No. 1,888,666 or Reissue No. 19,347. In this structure of Figs. 1 and 2 the hooks or loops 3 are formed after the respective tying operations have been completed. Thus each element 1 of said spring assembly is secured to two or more marginal springs 5. In each instance the extension tongue 2 of one element 1 overlaps the end of an adjacent element 1 and the wire tie 6 embraces the overlapped portions. Thus the extension tongues 2 of the elements 1 combine to form border wire frames extending around the upper and lower peripheral edges of the spring assembly.

As illustrated in Fig. 5, the extremities 7 of the tongues 2 of the elements 1 may be bent to extend perpendicularly to the bodies of said tongues 2 and the latter and said tongues 2 may be then positioned relatively to the springs 5 for engagement with the marginal helical springs 8 commonly employed for joining the springs of a spring assembly. After the said helical springs 8 have been disposed in place, the said extremities 7 of the tongues 2 are bent back, to form hooks engaging the helical springs 8, as will be obvious without illustration, to permanently secure the tongues 2 and elements 1 against displacement relatively to the springs 5.

In instances where the structure is in its preferred form (shown in Fig. 6) and is to be mounted upon spring assemblies of the well-known "Marshall" type or of the type illustrated in the L. A. Suekoff Patent No. 1,411,227, the end portions of the elements 1 and the body portions of the tongues 2 will be secured to the upper and lower peripheral corners of the spring assembly by means of stitching or hog nose rings or other suitable fastening devices, the latter being omitted from illustration as readily comprehensible to persons skilled in the art without special illustration.

While it is preferable to connect each element 1 with two or more springs by means of the extensions 2, as illustrated herein, said elements 1 devoid of said tongues 2 may be secured individually to the respective marginal springs 5 of a spring assembly of any type provided that the securing means cooperate with the elements 1 or formations in the terminal portions thereof to prevent said elements from creeping along the terminal coils of the springs 5 to which they are secured and thus become disposed inwardly of the periphery of the structure.

In use, the elements 1 will bow inwardly or outwardly under the influence of load on the edge of the spring assembly, but will normally maintain the verticality of said periphery.

In instance wherein padding is disposed between the boxing of the mattress or cushion and the marginal springs of the spring assembly thereof, the said elements 1 afford support for said padding.

The zig-zag wire springs constituting the elements 1, per se, are the full equivalents of flat resilient sheet metal springs but are preferable to the latter because of lighter weight and because of affording easier means of effecting connection thereof with the springs 5. Said elements 1 are also more or less equivalent to wire springs of U or V-shape, the arms of which project from a middle coil as in mouse-trap and similar structures, but are preferable to the latter because they will bow until their ends meet without being felt by the person seated upon the edge of a mattress or cushion equipped with the same.

The structure illustrated in Figs. 1 and 2 and Fig. 3, wherein the outer end portion of each tongue 2 overlaps the end portion of the next adjacent element 1 is preferable to the structure shown in Fig. 6.

Obviously, in the structure of Fig. 6, the loops 3 may be so formed as to enable the elements 1 to be adjusted to positions more closely proximate to each other than shown and thus cause the tongues 2 of each element to overlap in part or entirely the end portions of adjacent elements 1 as in the instance of Figs. 3 and 4. Thus, said elements 1 of Fig. 6 may be adjusted relatively to each other to space them apart to correspond with the spacing apart of the springs of the spring assembly, which may vary as to springs extending longitudinally and laterally of said assembly as in the case of the said Hetherington patent.

I claim as my invention:

1. A spring assembly comprising a group of conventional upholstery springs tied together in predetermined relation to each other, and a peripheral spring structure bordering said spring assembly and comprising a series of wire springs lying substantially in vertical planes tangential to the terminal coils of the marginal springs of the assembly, each of said wire springs equipped with substantially horizontally disposed terminal shanks and being relatively disposed so that the shanks of contiguous springs overlap each other, and means securing the overlapped portions of said shanks to each other and to the terminal coils of the marginal springs of the assembly thereby providing resilient border wire frames peripherally of said spring assembly.

2. A spring assembly comprising a group of conventional upholstery springs tied together in predetermined relation to each other, and a peripheral spring structure bordering said spring assembly and comprising a series of wire springs lying substantially in vertical planes tangential to the terminal coils of the marginal springs of the assembly, each of said wire springs equipped with substantially horizontally disposed terminal shanks and being relatively disposed so that the shanks of contiguous springs overlap each other, each terminal end portion of each of said shanks being coiled about the overlapping shank to effect a sliding connection between the springs equipped with said shanks and providing an articulate collapsible structure and means securing the overlapped portions of said shanks to each other and to the terminal coils of the marginal springs of the assembly thereby providing resilient border wire frames peripherally of said spring assembly.

3. As a new article of manufacture, a peripheral spring edging for conventional spring assemblies for upholstery comprising a series of wire springs each adapted to lie substantially in a vertical plane throughout its length and width and each including a pair of substantially parallel extended end portions equipped with terminal loops, each of the latter embracing and having sliding connection with the extended portion of a contiguous spring, the said component spring structure being articulate and collapsible and said extended end portions of the component springs thereof being adapted to be secured to the outermost portions of the terminal coils of the marginal upholstery springs of the conventional spring assembly and together constituting peripheral border wire frames for said marginal springs.

WILLIAM W. GLEASON.